United States Patent [19]

Nakano et al.

[11] Patent Number: 4,708,365

[45] Date of Patent: Nov. 24, 1987

[54] APPARATUS FOR CONTROLLING SEATBELT SYSTEM

[75] Inventors: Tasuku Nakano; Kazuo Kouno; Kazunari Hibino; Masashi Sakurai, all of Aichi, Japan

[73] Assignee: Kabushiki Kaisha Tokai-Rika-Denki-Seisakusho, Japan

[21] Appl. No.: 862,255

[22] Filed: May 12, 1986

[30] Foreign Application Priority Data

| May 13, 1985 | [JP] | Japan | 60-70196[U] |
| May 13, 1985 | [JP] | Japan | 60-70197[U] |
| May 13, 1985 | [JP] | Japan | 60-70198[U] |

[51] Int. Cl.$^4$ .............................................. B60R 21/10
[52] U.S. Cl. ..................................... 280/801; 280/804
[58] Field of Search ................ 180/268, 270; 280/801, 280/802, 803, 804, 806; 297/474, 479

[56] References Cited

U.S. PATENT DOCUMENTS

| 4,480,713 | 11/1984 | Macht et al. | 280/801 |
| 4,553,625 | 11/1985 | Tsuge et al. | 280/801 |
| 4,573,709 | 3/1986 | Kawai et al. | 280/801 |

Primary Examiner—Richard A. Bertsch
Attorney, Agent, or Firm—Sixbey, Friedman & Leedom

[57] ABSTRACT

An apparatus for controlling a seatbelt system in which the distal end portion of a webbing is moved in the longitudinal direction of a vehicle by a motor, thereby allowing the webbing to be automatically fastened to and unfastened from the body of an occupant. The apparatus has a motor overload detecting circuit which detects an overloaded state of the motor by detecting a change in the current flowing through the motor. When the motor is overloaded, the motor is turned OFF. Accordingly, even when the occupant moves during the movement of the webbing and the webbing consequently interferes with the occupant's neck or head, it is possible to prevent the occupant from feeling uncomfortable and the motor from being burned out.

19 Claims, 21 Drawing Figures

Rx : Thermistor

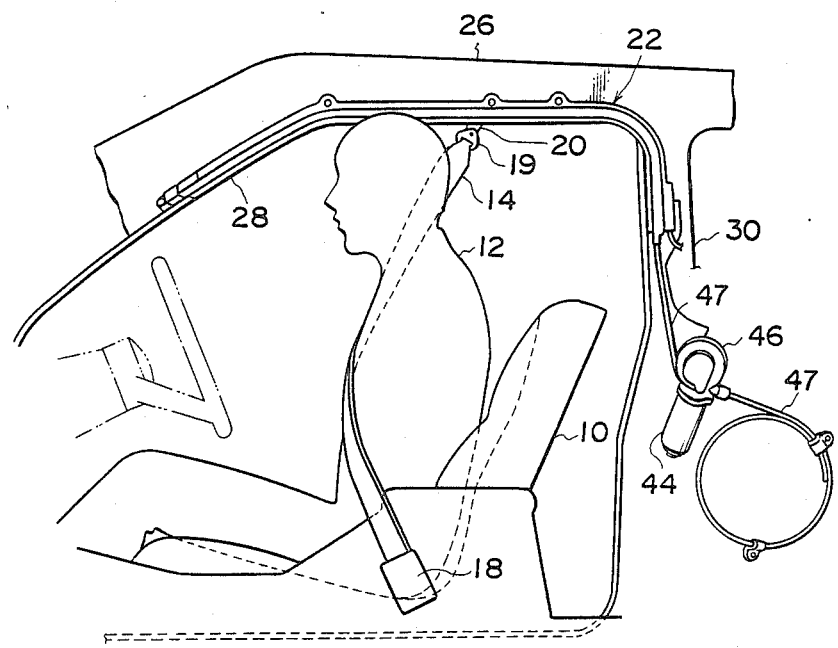

APPARATUS FOR CONTROLLING SEATBELT SYSTEM

BACKGROUND OF THE INVENTION

1. Field of the Invention

The present invention relates to an apparatus for controlling an occupant protecting seatbelt system in which the distal end portion of an occupant restraining webbing is moved along a guide rail mounted on the body of a vehicle, and the webbing is thereby automatically fastened to and unfastened from the body of an occupant.

2. Description of the Prior Art

This type of seatbelt system is arranged as shown in FIG. 21. More specifically, an anchor plate 20 is connected through a connecting member to the distal end of a webbing 14 unwound from a retractor 18. This anchor plate 20 is movable in the longitudinal direction of the vehicle while being guided by a guide rail 22 mounted on the body of the vehicle. The apparatus for controlling this seatbelt system is arranged such that, when a door switch, which serves as a means for detecting an occupant entering or leaving the vehicle, detects the fact that the door concerned is opened, a motor 44 is rotated forward so as to move the anchor plate 20 toward the front end of the vehicle, thereby unfastening the webbing 14 from the body of an occupant 12. When the door switch detects the fact that the door is closed, the motor 44 is rotated backward so as to move the anchor plate 20 toward the rear end of the vehicle, thereby fastening the webbing 14 to the body of the occupant 12.

This type of controlling apparatus suffers, however, from the following problems. When the occupant 12 moves the upper part of his body while the anchor plate 20 is moving, the upper portion of the webbing 14 may interfere with the occupant's neck or head to make him feel uncomfortable. In addition, the motor 44 may be burned out in such case.

SUMMARY OF THE INVENTION

In view of the above-described circumstances, it is a primary object of the present invention to provide a seatbelt system controlling apparatus so designed that, even when the occupant moves the upper part of his body while the distal end portion of the webbing is moving and the webbing consequently interferes with the occupant's neck or head, there is no fear of the occupant feeling uncomfortable and no risk of the motor being burned out.

To this end, the present invention provides a seatbelt system controlling apparatus which comprises a motor overload detecting means adapted to detect an overloaded state of the motor, and a motor suspending means adapted to turn OFF the motor for a predetermined period of time when an overloaded state of the motor is detected after a predetermined period of time has elapsed from the time of starting the motor With the above-described arrangement, when the occupant moves the upper part of his body while the distal end portion of the webbing is moving and thereby causes the motor to be mechanically suspended, the motor overload detecting means detects an overloaded state of the motor. In consequence, the motor suspending means cuts off the supply of electric current to the motor for a predetermined period of time. Accordingly, even when the occupant moves the upper part of his body during the movement of the distal end portion of the webbing and the webbing consequently interferes with the occupant's neck or head, there is no fear of the occupant feeling uncomfortable and no risk of the motor being burned out.

BRIEF DESCRIPTION OF THE DRAWINGS

FIG. 21 is a side view corresponding to FIG. 2, which shows problems experienced with the prior art.

DESCRIPTION OF THE PREFERRED EMBODIMENTS

The present invention will be described hereinunder in detail with reference to the accompanying drawings.

Figure 2:
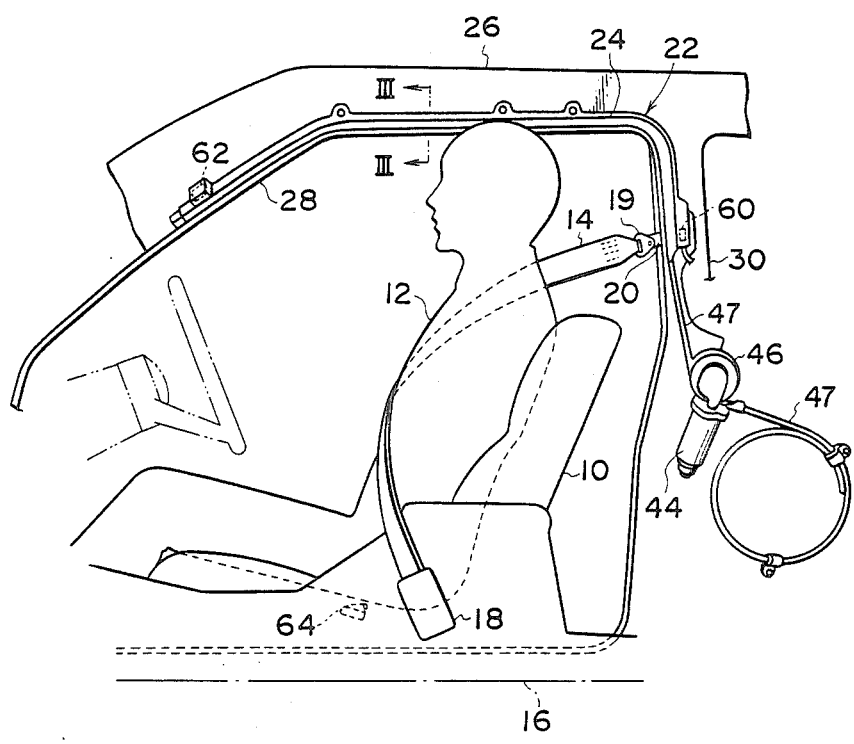
FIG. 2 is a side view of a seatbelt system to which the first embodiment is applied, which shows an occupant having the seatbelt system fastened.

FIG. 2 is a side view of a seatbelt system to which a first embodiment of the present invention is applied.

The seatbelt system is arranged such that a webbing 14 can automatically be fastened to the body of an occupant 12 seated in a seat 10. One end of the webbing 14 is wound up by a predetermined biasing force into a retractor 18 mounted on a floor member 16 in an approximate center of the body of a vehicle. The retractor 18 incorporates an inertia type lock mechanism adapted for instantaneously suspending the webbing 14 from being unwound when an emergency situation of the vehicle occurs.

The other end of the webbing 14 is retained by an anchor plate 20 through a connecting member 19. The anchor plate 20 is movable along a guide rail 22 in the longitudinal direction of the vehicle. The guide rail 22 includes a guide rail body 24. The central portion of the guide rail body 24 is horizontally disposed on a roof side member 26 which constitutes a part of a side wall of the vehicle body. The forward end portion (the end portion closer to the front end of the vehicle) of the guide rail body 24 obliquely extends along a front pillar 28. The rear end portion (the end portion closer to the rear end of the vehicle) of the guide rail body 24 is bent at substantially right angles so as to extend toward the lower side of the vehicle, and secured to a center pillar 30.

Figure 3:
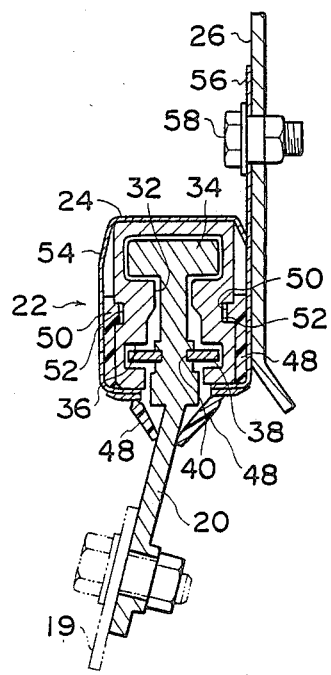
FIG. 3 is an enlarged sectional view taken along the line III—III in FIG. 2, which shows the seatbelt system in a state wherein the anchor plate has moved to the position of the line III—III.

Referring next to FIG. 3, the guide rail body 24 has a groove 32 opening toward the lower side of the vehicle, thus forming a substantially U-shaped cross-section. The bottom portion of the groove 32 is enlarged in width so as to accommodate a head portion 34 of the anochor plate 20 which is formed at the distal end thereof. The head portion 34 serves to reliably transmit the tension generated in the webbing 14 in an emergency situation of the vehicle to the roof side member 26.

An intermediate portion of the groove 32 in the heightwise direction thereof is partially enlarged in width so as to provide a tape accommodating groove 36, thereby slidably guiding a flexible tape 38 in the longitudinal direction of the guide rail 22.

Figure 4:
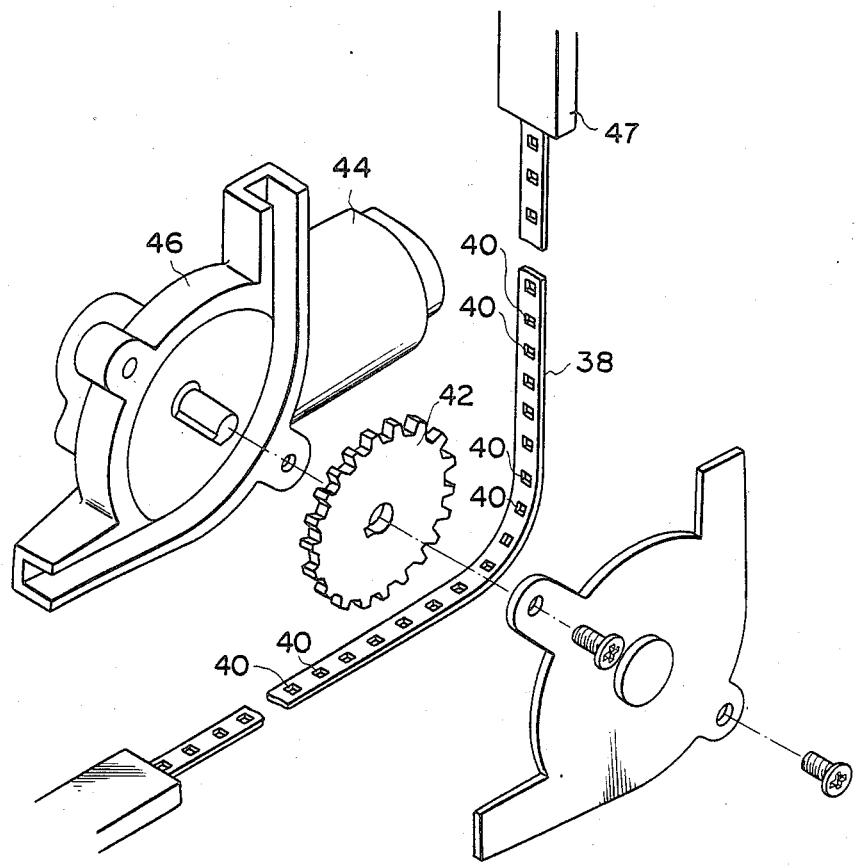
FIG. 4 is an exploded perspective view of a flexible tape and a sprocket for driving the anchor plate received in a guide rail, which shows the relationship therebetween.

The flexible tape 38 is, as shown in FIG. 4, a thick-walled continuous member which is provided with a plurality of openings 40 along the longitudinal direction thereof. The anchor plate 20 is received through one of the openings 40 so that the anchor plate 20 moves together with the flexible tape 38. A part of the flexible tape 38 engages with sprocket wheel 42 which is provided on the lower part of the center pillar 30. The sprocket wheel 42 is rotated by the driving force from a motor 44 so as to move the flexible tape 38 in the longitudinal direction thereof. The sprocket wheel 42 is accommodated in a housing 46 secured to the lower part of the center pillar 30 so that the engagement between the sprocket wheel 42 and the flexible tape 38 is ensured. A tape guide rail 47 is provided between the sprocket housing 46 and the guide rail body 24. Another tape guide rail 47 is provided on the side of the sprocket housing 46 which is remote from the guide rail body 24, this rail 47 being looped.

As shown in FIG. 3, strips 48 respectively abut against both sides of the guide rail body 24 near the inlet of the groove 32. A projection 50 is provided on a portion of each of the strips 48 so that the projection 50 is received in a groove 52 formed in each side of the guide rail body 24. The respective distal ends of the strips 48 project from the lower end of the guide rail body 24 so as to abut against each other, thereby closing the inlet of the groove 32. However, when the anchor plate 20 passes a particular portion of the strips 48 abutting against each other, they are separated from each other only at this portion, thereby allowing the anochor plate 20 to pass without any hindrance.

The guide rail body 24 and the respective upper portions of the strips 48 are covered by a cover 54. A mounting plate 56 is secured to one side of the cover 54. The mounting plate 56 is screwed at the other side thereof to the roof side member 26 by bolts 58. As shown in FIG. 2, an unfastening position detecting switch 62 is disposed at the forward end of the guide rail body 24 to detect the anchor plate 20 reaching the front limit of its movement. A fastening position detecting switch 60 is disposed at the rear end of the guide rail body 24 to detect the anchor plate 20 reaching the rear limit of its movement. A seat switch 64 is disposed in the seat cushion of the seat 10 to detect the fact that the occupant 12 is seated in the seat 10. It should be noted that a door switch (see FIG. 1) for detecting the opening or closing of the door concerned is disposed on the vehicle body, although not shown in FIG. 2.

Figure 1:
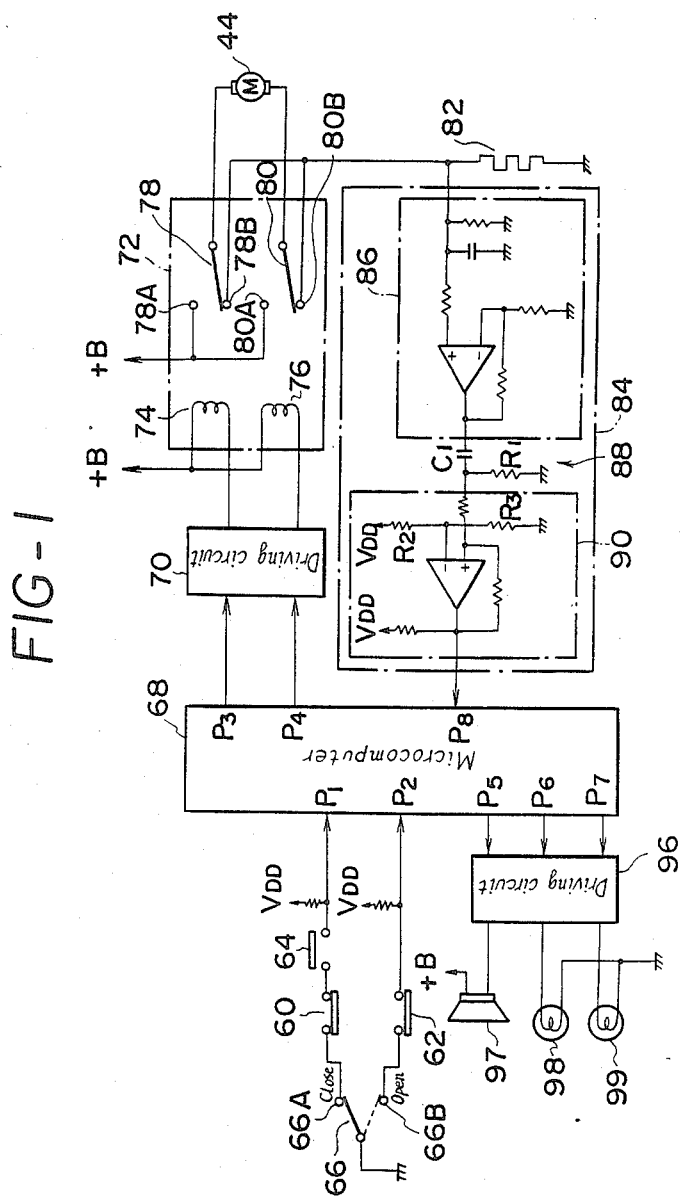
FIG. 1 is a circuit diagram of a first embodiment of the seatbelt system controlling apparatus according to the present invention.

The following is a description of a seatbelt system controlling apparatus in accordance with a first embodiment of the present invention for controlling fastening and unfastening of the seatbelt system arranged as detailed above, with reference to FIG. 1.

The common terminal of the door switch 66 is grounded. The closed-side terminal 66A of the door switch 66 is connected to an input terminal $P_1$ of a microcomputer 68 through the fastening position detecting switch 60 and the seat switch 64. Accordingly, when the door is closed and the occupant is seated in the seat to close the seat switch 64, the potential of the input terminal $P_1$ shifts to a low level (hereinafter referred to as "L"). When the anchor plate 20 is moved toward the rear end of the vehicle and the fastening of the webbing is completed, the fastening position detecting switch 60 is opened, and the potential of the input terminal $P_1$ shifts to a high level (hereinafter referred to as "H").

The open-side terminal 66B of the door switch 66 is connected to an input terminal $P_2$ of the microcomputer 68 through the unfastening position detecting switch 62. Accordingly, when the door is opened, the input terminal $P_2$ shifts to "L", and when the anchor plate 20 is moved toward the front end of the vehicle and the webbing is consequently unfastened, the unfastening position detecting switch 62 is opened, and the input terminal $P_2$ shifts to "H".

A motor forward rotating signal is output from an output terminal $P_3$ of the microcomputer 68 so as to excite a relay coil 74 of a relay 72 through a driving circuit 70, thereby allowing a C-contact (change-over contact) 78 to be activated. A motor reversing signal is output from an output terminal $P_4$ of the microcomputer 68 so as to excite a relay coil 76 of the realy 72 through the driving circuit 70, thereby allowing a C-contact 80 to be activated. The motor 44 is connected to the common terminals of the C-contacts 78 and 80. The normally-open terminal 78A of the C-contact 78 and the normally open terminal 80A of the C-contact 80 are connected to a +B volt terminal of a power circuit (not shown). The normally-closed terminal 78B of the C-contact 78 and the normally-closed terminal 80B of the C-contact 80 are grounded through a resistor 82. Accordingly, when the relay coil 74 is excited to connect the common terminal of the C-contact 78 and the normally-open terminal 78A thereof, the motor 44 is rotated forward, whereas, when the relay coil 76 is excited to connect the common terminal of the C-contact 80 and the normally-open terminal 80A thereof, the motor 44 is rotated backward.

The current flowing through the motor 44, that is, the current flowing through the resistor 82, is proportional to the voltage across the resistor 82. The voltage across the resistor 82 is supplied to a voltage amplifying circuit 86 in an overcurrent detecting circuit 84 so as to be amplified thereby, and is then supplied to a differentiation circuit 88 where the DC component of the voltage is removed, and the AC component thereof alone is supplied to a comparator 90. The AC voltage component is compared with a reference voltage determined by resistance values $R_2$ and $R_3$, and the output of the comparator 90 is supplied to a input terminal $P_8$ of the microcomputer 68. More specifically, when the rate of change in the current flowing through the motor 44 exceeds a predetermined value, the potential of the input terminal $P_8$ shifts to "H".

Since an overloaded state of the motor 44 is detected on the basis of the rate of change in the current flowing through the motor 44, it is possible to reliably detect an overloaded state of the motor 44 independently of any change in the current normally flowing through the motor 44 which may be caused by a temperature change.

A speaker 97 and indicating lamps 98, 99 are connected to the microcomputer 68 through a driving circuit 96. Thus, when the movement of the anchor plate 20 is restrained, an electronic sound is produced from the speaker 97, and the indicating lamp 98 is made to flash when the anchor plate 20 is locked when the webbing is being unfastened from the occupant's body, whereas the indicating lamp 99 is caused to flash when the anchor plate 20 is locked when the webbing is being fastened to the occupant's body, thereby giving warning to the occupant. Normally, the indicating lamp 98 is turnd ON when the webbing is unfastened, and the indicating lamp 99 is turned ON when the webbing is fastened.

Figure 5:
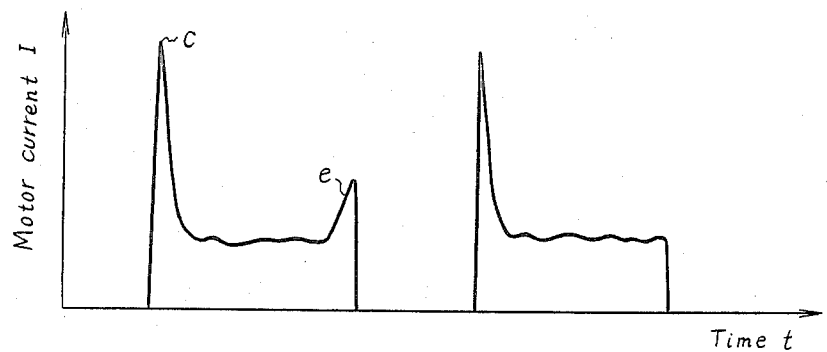
FIG. 5 is a graph showing the current flowing through the motor employed in the first embodiment as a function of time.
Figure 6:
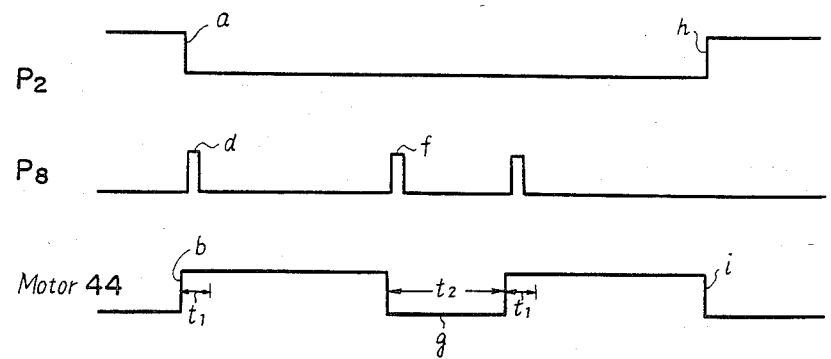
FIG. 6 is a waveform chart showing the output of the microcomputer employed in the first embodiment, the output corresponding to the motor current shown in FIG. 5.

The operation of the first embodiment, arranged as described above, will schematically be explained hereinunder with reference to the graph shown in FIG. 5 and the waveform chart shown in FIG. 6.

In the case where the occupant leaves the vehicle, when the door is opened, the open-side terminal 66B of the door switch 66 is grounded, and the potential of the input terminal $P_2$ of the microcomputer 68 shifts to "L" (see a in FIG. 6). Reading the fall in potential of the input terminal $P_2$, the microcomputer 68 raises the potential of the output terminal $P_3$ to "H" so as to excite the relay coil 74, thus causing the motor 44 to rotate forward (see b in FIG. 6). In consequence, starting current flows through the motor 44 (see c in FIG. 5), and a pulse is input to the input terminal $P_8$ (see d in FIG. 6). Even when the potential of the input terminal $P_8$ shifts to "H", the microcomputer 68 ignores this fact until a predetermined time $t_1$ has elapsed after the motor 44 has been turned ON. When, after the elapse of the time $t_1$, the occupant moves the upper part of his body in order to leave the vehicle and the webbing 14 consequently interferes with the occupant's neck or head and restrains the movement of the anchor plate 20, the impedance of the motor 44 decreases, and the current flowing through the resistor 82 increases (see e in FIG. 5), so that the potential of the input terminal $P_8$ shifts to "H" (see f in FIG. 6). When the input terminal $P_8$ becomes "H", the microcomputer 68 shifts the potential of the output terminal $P_3$ to "L" so as to turn OFF the motor 44 for a predetermined time $t_2$ (see g in FIG. 6). The microcomputer 68 then raises the potential of the output terminal $P_3$ again so as to turn ON the motor 44, and the above-described processing is repeated thereafter.

Accordingly, even when the occupant moves the upper part of his body while the distal end portion of the webbing is moving and the webbing consequently interferes with the occupant's neck or head, there is no fear of the occupant feeling uncomfortable and no risk of the motor 44 being burned out.

When the anchor plate 20 moves to the position of the unfastening position detecting switch 62, this switch 62 is opened, thus causing the potential of the input terminal $P_2$ to rise to "H" (see h in FIG. 6). Reading the rise in potential of the input terminal $P_2$, the microcomputer 68 shifts the potential of the output terminal $P_3$ to "L" so as to turn OFF the motor 44 (see i in FIG. 6). When the occupant enters the vehicle also, the apparatus operates in a manner similar to the above.

Figure 7:
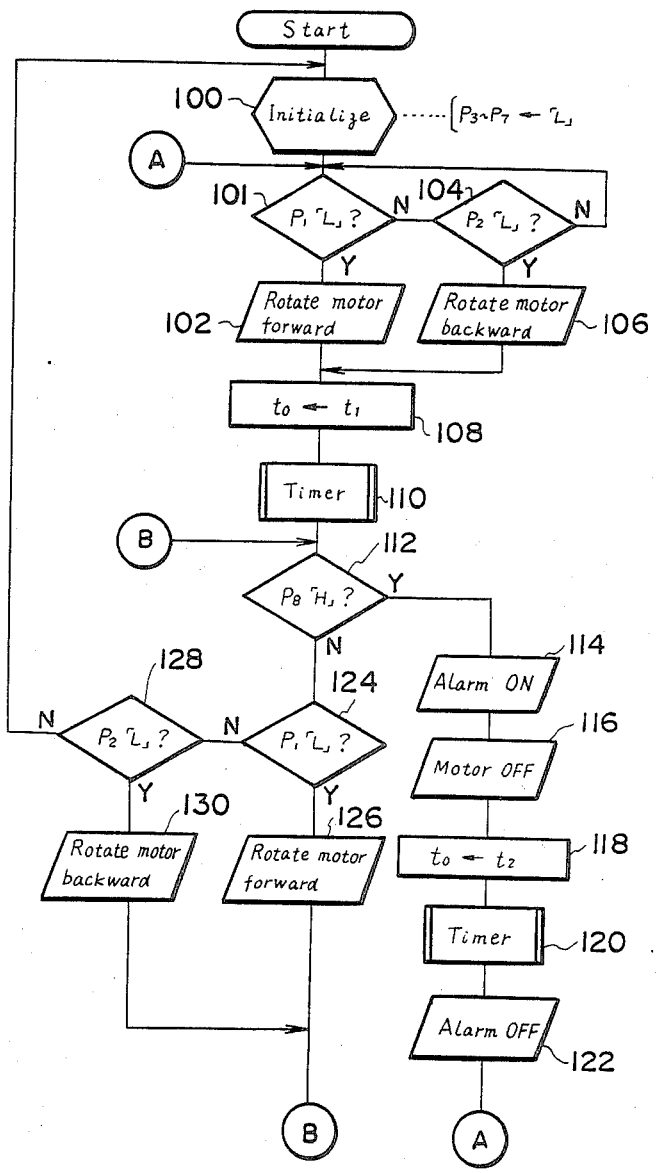
FIGS. 7 and 8 show control flowcharts in accordance with the first embodiment.
Figure 8:
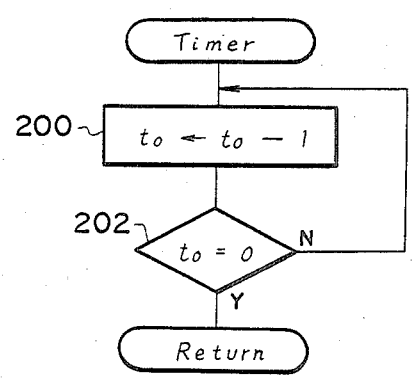

The details of the above-described operation will be explained below with reference to the control flowcharts shown in FIGS. 7 and 8.

First of all, the work area of a RAM incorporated in the microcomputer 68 and the output terminals $P_3$ to $P_7$ thereof are initialized (Step 100), that is, an "L" signal is output from each of the output terminals $P_3$ to $P_7$. The microcomputer 68 awaits until the potential of either the input terminal $P_1$ or $P_2$ becomes "L" (Steps 101, 104). When the microcomputer 68 reads the fact that the potential of the input terminal $P_1$ becomes "L", it raises the output terminal $P_3$ to "H", thereby rotating the motor 44 forward, and also shifts the output terminal $P_6$ to "H", thereby turning ON the indicating lamp 98 (Step 102). These outputs are self-maintained until "L" signals are output. The same is the case with the other outputs. When the microcomputer 68 reads the fact that the potential of the input terminal $P_2$ has become "L", the output terminals $P_4$ and $P_7$ are raised to "H", thus causing the motor 44 to rotate backward and the indicating lamp 99 to turn ON (Step 106). When the processing of either Step 102 or 106 has been completed, $t_1$ is set as a value for $t_0$ (Step 108), and a subroutine of a soft-timer shown in FIG. 8 is processed (Step 110). More specifically, as shown in FIG. 8, the value of $t_0$ is decremented (Step 200), and this is repeated until the value of $t_0$ becomes zero (Step 202). Thus, it is possible to ignore the fact that the input terminal $P_8$ is raised to "H" by the starting current flowing through the motor 44. Then, the microcomputer 68 reads whether or not the potential of the input terminal $P_8$ is at "H", that is, whether or not the movement of the anchor plate 20 is restrained. When the input terminal $P_8$ is at "H" (Step 112), an alarm is sounded from the speaker 97, and when the input terminal $P_1$ is at "L", the indicating lamp 98 is made to flash, whereas, when the input terminal $P_2$ is at "L", the indicating lamp 99 is caused to flash (Step 114). Then, the output terminals $P_3$ and $P_4$ are shifted to "L" to turn OFF the motor 44. It should be noted that the potential of either the output terminal $P_3$ or $P_4$ has already been at "L". Then, $t_2$ is set as a value for $t_0$ (Step 118), and the subroutine shown in FIG. 8 is processed to await the elapse of a predetermined time $t_2$ (Step 120). Then, the sounding of the alarm from the speaker 97 is stopped (Step 122). Then, the process returns to Step 101 in order not to read the "H" potential of the input terminal P₈ for the period of time t₁ when the motor 44 is activated again. In the case where the potential of the input terminal P₈ is at "L" in Step 112, when the input terminal P₁ is at "L", the output terminal P₃ is raised to "H", thus causing the motor 44 to rotate forward (Steps 124, 126), whereas, when the input terminal P₂ is at "L", the output terminal P₄ is raised to "H", thus causing the motor 44 to rotate backward (Steps 128, 130). Then, the process returns to Step 112. Since the outputs from the output terminals P₃ to P₇ are self-maintained, there is no change in the outputs even when the output terminals P₃ to P₇ which are at "H" are further raised to "H". The same is the case with the occasion where the output terminals P₃ to P₇ are at "L". When both the input terminals P₁ and P₂ are at "H", the process returns to the first Step 100 in which the motor 44 and the indicating lamps 98, 99 are turned OFF, and the above-described processing is then repeated.

Figure 9:
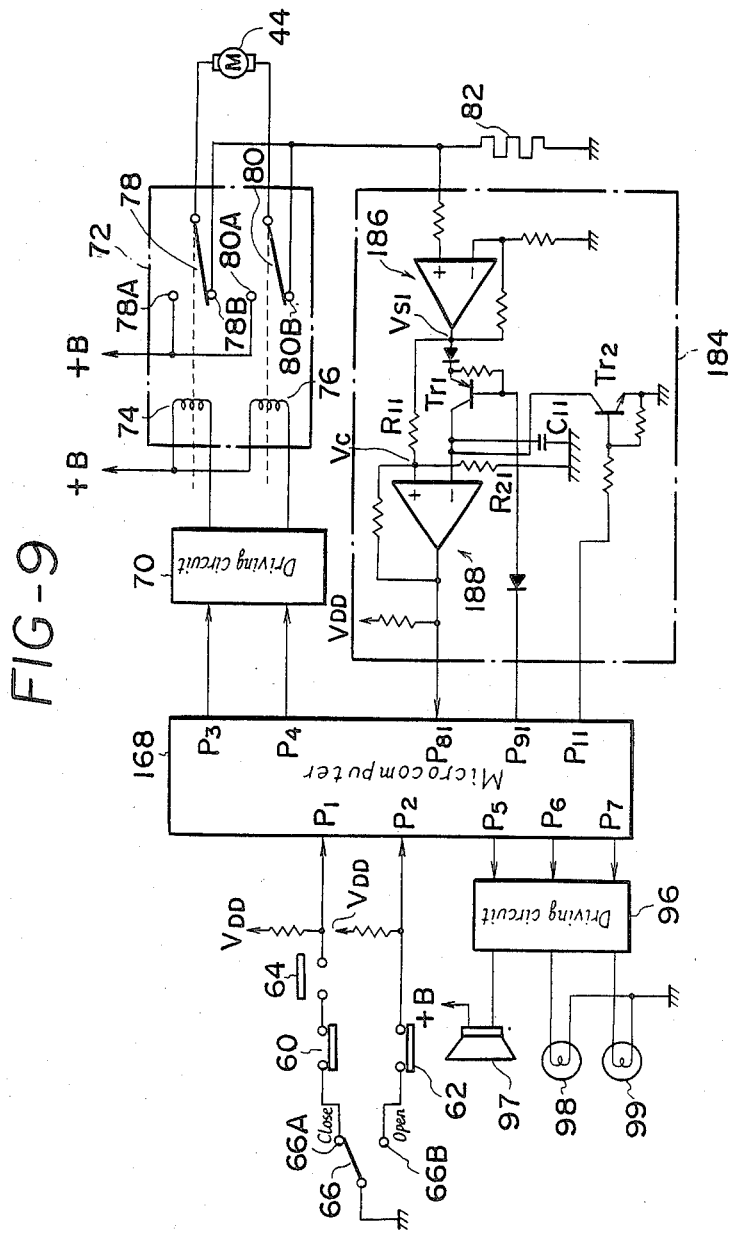
FIG. 9 is a circuit diagram of a second embodiment of the seatbelt system controlling apparatus according to the present invention.

A second embodiment of the seatbelt system controlling apparatus according to the present invention will be described below with reference to FIG. 9. In FIG. 9, the same members as those in the first embodiment are denoted by the same reference numerals.

The common terminal of the door switch 66 is grounded. The closed-side terminal 66A of the door switch 66 is connected to an input terminal P₁ of a microcomputer 168 through the fastening position detecting switch 60 and the seat switch 64. Accordingly, when the door is closed and the occupant is seated in the seat to close the seat switch 64, the potential of the input terminal P₁ shifts to a low level (hereinafter referred to as "L"). When the anchor plate 20 is moved toward the rear end of the vehicle and the fastening of the webbing is completed, the fastening position detecting switch 60 is opened, and the potential of the input terminal P₁ shifts to a high level (hereinafter referred to as "H").

The open-side terminal 66B of the door switch 66 is connected to an input terminal P₂ of the microcomputer 168 through the unfastening position detecting switch 62. Accordingly, when the door is opened, the input terminal P₂ shifts to "L", and when the anchor plate 20 is moved toward the front end of the vehicle and the webbing is consequently unfastened, the unfastening position detecting switch 62 is opened, and the input terminal P₂ shifts to "H".

A motor forward rotating signal is output from an output terminal P₃ of the microcomputer 168 so as to excite a relay coil 74 of a relay 72 through a driving circuit 70, thereby allowing a C-contact (change-over contact) 78 to be activated. A motor reversing signal is output from an output terminal P₄ of the microcomputer 168 so as to excite a relay coil 76 of the realy 72 through the driving circuit 70, thereby allowing a C-contact 80 to be activated. The motor 44 is connected to the common terminals of the C-contacts 78 and 80. The normally-open terminal 78A of the C-contact 78 and the normally-open terminal 80A of the C-contact 80 are connected to a +B volt terminal of a power circuit (not shown). The normally-closed terminal 78B of the C-contact 78 and the normally-closed terminal 80B of the C-contact 80 are grounded through a resistor 82. Accordingly, when the relay coil 74 is excited to connect the common terminal of the C-contact 78 and the normally-open terminal 78A thereof, the motor 44 is rotated forward, whereas, when the relay coil 76 is excited to connect the common terminal of the C-contact 80 and the normally-open terminal 80A thereof, the motor 44 is rotated backward. The arrangement of a part of the second embodiment hereinbefore described is similar to that of the first embodiment.

The current flowing through the motor 44, that is, the current flowing through the resistor 82, is proportional to the voltage across the resistor 82. The voltage across the resistor 82 is supplied to a voltage amplifying circuit 186 in an overcurrent detecting circuit 184 so as to be amplified thereby, and is then supplied to the + input terminal of a comparator 188 through a resistor $R_{11}$ (the resistance value is also denoted by $R_{11}$. The same rule applies correspondingly to the following). A resistor $R_{21}$ is connected between the + input terminal and the ground. If the voltage output from the voltage amplifying circuit 186 is represented by $V_{S1}$ and the voltage at the + input terminal of the comparator 188 by $V_C$, the following formula is given:

$$V_C = R_{21} V_{S1} / (R_{11} + R_{21}) \tag{1}$$

The output terminal of the voltage amplifying circuit 186 is connected to the − input terminal of the comparator 188 through a transistor $Tr_1$ which serves as a charging switch. In addition, a capacitor $C_{11}$ and a transistor $Tr_2$ which serves as a discharging switch are connected in parallel between the − input terminal of the comparator 188 and the ground.

Accordingly, when an output terminal $P_{91}$ of the microcomputer 168 is shifted to "L" and the transistor $Tr_1$ is turned ON, the output current from the voltage amplifying circuit 186 is stored in the capacitor $C_{11}$, so that the − input terminal voltage of the comparator 188 becomes equal to the output voltage $V_{S1}$ of the voltage amplifying circuit 186. Then, when the output terminal $P_{91}$ of the microcomputer 168 is raised to "H" and the transistor $Tr_1$ is turned OFF, the − input terminal voltage $V_{S1}$ of the comparator 188 is held. When an output terminal $P_{11}$ of the microcomputer 168 is raised to "H", the charge accumulated in the capacitor $C_{11}$ is discharged, whereas, when the output terminal $P_{11}$ is shifted to "L", the capacitor $C_{11}$ is allowed to be charged.

The output voltage of the comparator 188 is supplied to an input terminal $P_{81}$ of the microcomputer 168, whereby it is possible to detect an overloaded state of the motor 44.

A speaker 97 and indicating lamps 98, 99 are connected to the microcomputer 68 through a driving circuit 96. Thus, when the movement of the anchor plate 20 is restrained, an electronic sound is produced from the speaker 97, and the indicating lamp 98 is made to flash when the anchor plate 20 is locked when the webbing is being unfastened from the occupant's body, whereas the indicating lamp 99 is caused to flash when the anchor plate 20 is locked when the webbing is being fastened to the occupant's body, thereby giving warning to the occupant. Normally, the indicating lamp 98 is turnd ON when the webbing is unfastened, and the indicating lamp 99 is turned ON when the webbing is fastened.

Figure 10:
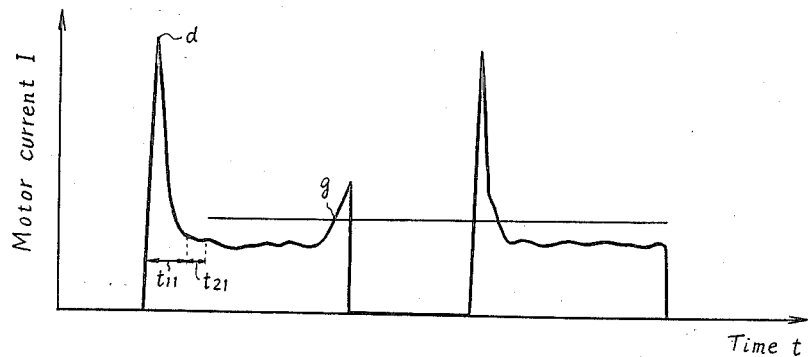
FIG. 10 is a graph showing the current flowing through the motor employed in the second embodiment as a function of time.

The operation of the second embodiment, arranged as described above, will schematically be explained below with reference to the graph shown in FIG. 10 and the waveform chart shown in FIG. 11.

Figure 11:
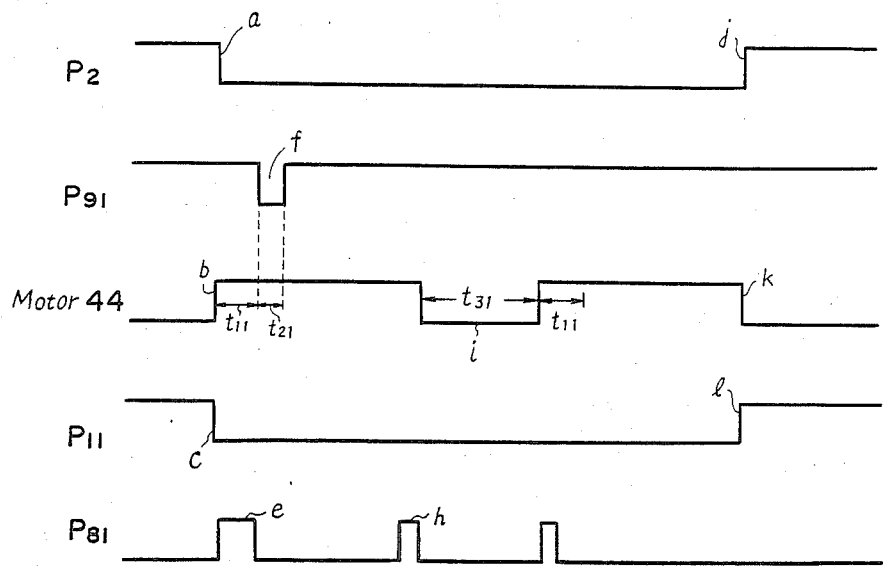
FIG. 11 is a waveform chart of the output of the microcomputer employed in the second embodiment, the output corresponding to the motor current shown in FIG. 10.

In the case where the occupant leaves the vehicle, when the door is opened, the open-side terminal 66B of the door switch 66 is grounded, and the potential of the input terminal $P_2$ of the microcomputer 168 shifts to "L" (see a in FIG. 11). Reading the fall in potential of the input terminal $P_2$, the microcomputer 168 raises the potential of the output terminal $P_3$ to "H" so as to excite the relay coil 74, thus causing the motor 44 to rotate forward (see b in FIG. 11). In addition, the output terminal $P_{11}$ is shifted to "L", thereby allowing the capacitor $C_{11}$ to be re-charged (see c in FIG. 11). In consequence, starting current flows through the motor 44 (see d in FIG. 10), and a pulse is input to the input terminal $P_{81}$ (see e in FIG. 11). Even when the potential of the input terminal $P_{81}$ shifts to "H", the microcomputer 168 ignores this fact until a predetermined time $t_{11}$ has elapsed after the motor 44 has been turned ON. Then, the output terminal $P_{91}$ is held at "L" for a predetermined time $t_{21}$ so as to turn ON the transistor $Tr_1$, thereby charging the capacitor $C_{11}$. In consequence, an output voltage $V_{S1}$ of the voltage amplifying circuit 186 corresponding to a normal current flowing through the motor 44 (a normal current flowing through the motor 44 under various conditions such as ambient temperature) is supplied to the — input terminal of the comparator 188 and held thereby. When, after the elapse of the time $t_{11}$, the occupant moves the upper part of his body in order to leave the vehicle and the webbing 14 consequently interferes with the occupant's neck or head and restrains the movement of the anchor plate 20, the impedance of the motor 44 decreases, and the current flowing through the resistor 82 increases (see g in FIG. 10). If the condition of $V_C > V_{S1}$, that is, $$R_{21}V_S/(R_{11}+R_{21}) > V_{S1} \qquad (2)$$

is satisfied, the potential of the input terminal $P_8$ shifts to "H" (see h in FIG. 11). When the input terminal $P_{81}$ becomes "H", the microcomputer 168 shifts the potential of the output terminal $P_3$ to "L" so as to turn OFF the motor 44 for a predetermined time $t_{31}$ (see i in FIG. 11). The microcomputer 168 then raises the potential of the output terminal $P_3$ to "H" again so as to turn ON the motor 44, and the above-described processing is repeated thereafter.

Accordingly, even when the occupant moves the upper part of his body while the distal end portion of the webbing is moving and the webbing consequently interferes with the occupant's neck or head, there is no fear of the occupant feeling uncomfortable and no risk of the motor 44 being burned out. In addition, when a current which is a predetermined value higher than a normal motor current which is determined in consideration of ambient temperature and the like flows through the motor 44, the input terminal $P_{81}$ is raised to "H". It is therefore possible to reliably detect an overloaded state of the motor 44 even when there is a change in conditions such as ambient temperature.

When the anchor plate 20 moves to the position of the unfastening position detecting switch 62, this switch 62 is opened, thus causing the potential of the input terminal $P_2$ to rise to "H" (see h in FIG. 11). Reading the rise in potential of the input terminal $P_2$, the microcomputer 168 shifts the potential of the output terminal $P_3$ to "L" so as to turn OFF the motor 44 (see i in FIG. 11). When the occupant enters the vehicle also, the apparatus operates in a manner similar to the above.

Figure 12:
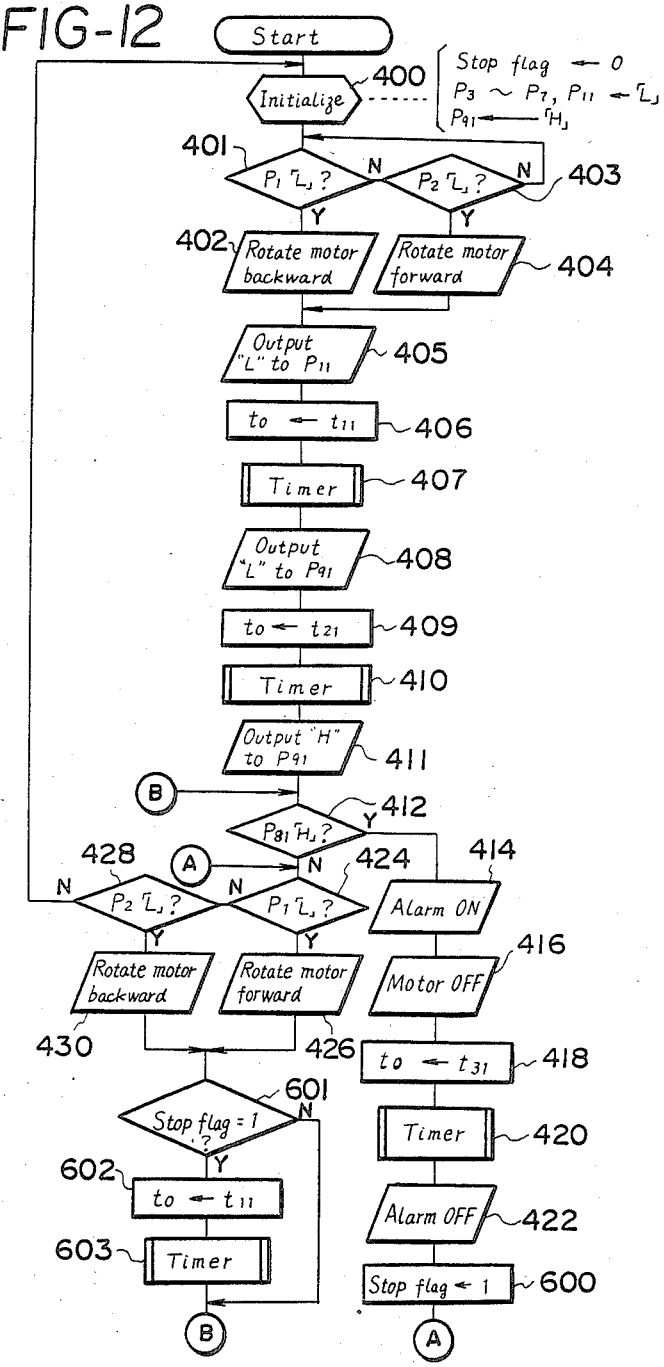
FIGS. 12 and 13 show control flowcharts in accordance with the second embodiment.
Figure 13:
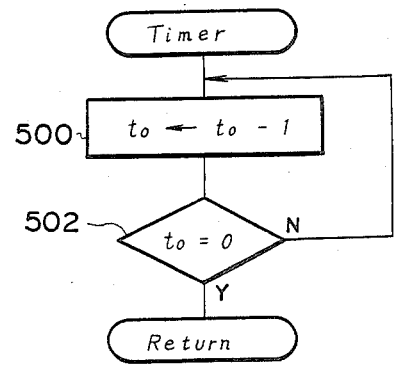

The details of the above-described operation will be explained below with reference to the control flowcharts shown in FIGS. 12 and 13.

First of all, the work area of a RAM incorporated in the microcomputer 168 and the output terminals $P_3$ to $P_7$ and $P_{11}$ thereof are initialized (Step 400), that is, an "L" signal is output from each of the output terminals $P_3$ to $P_7$ and $P_{11}$, and an "H" signal is output to the output terminal $P_{91}$. The microcomputer 68 awaits until the potential of either the input terminal $P_1$ or $P_2$ becomes "L" (Steps 401, 403). When the microcomputer 168 reads the fact that the potential of the input terminal $P_1$ has become "L", it raises the output terminal $P_3$ to "H", thereby rotating the motor 44 forward, and also shifts the output terminal $P_6$ to "H", thereby turning ON the indicating lamp 98 (Step 402). These outputs are self-maintained until "L" signals are output. The same is the case with the other outputs. When the microcomputer 168 reads the fact that the potential of the input terminal $P_2$ has become "L", the output terminals $P_4$ and $P_7$ are raised to "H", thus causing the motor 44 to rotate backward and the indicating lamp 99 to turn ON (Step 404). When the processing of either Step 402 or 404 has been completed, the output terminal $P_{11}$ is raised to "H", thereby discharging the capacitor $C_{11}$ and allowing it to be charged (Steps 405). Then, $t_1$ is set as a value for $t_0$ (Step 406), and a subroutine of a soft-timer shown in FIG. 13 is processed (Step 407). More specifically, as shown in FIG. 13, the value of $t_0$ is decremented (Step 500), and this is repeated until the value of $t_0$ becomes zero (Step 502). Thus, it is possible to ignore the fact that the input terminal $P_{81}$ is raised to "H" by the starting current flowing through the motor 44. Then, the output terminal $P_{91}$ is shifted to "L", thereby starting charging of the capacitor $C_{11}$ (Step 408). Then, $t_{21}$ is set as a value for $t_0$ (step 409), and the subroutine shown in FIG. 13 is processed to await the elapse of a predetermined time $t_{21}$ (Step 410). Then, the output terminal $P_{91}$ is raised to "H" so as to hold the charge stored in the capacitor $C_{11}$ (Step 411). Thus, an output voltage $V_{S1}$ of the voltage amplifying circuit 186 corresponding to the normal motor current is supplied to the — input terminal of the comparator 188 so as to be used as a reference voltage for the comparator 188. Then, the microcomputer 68 reads whether of not the potential of the input terminal $P_{81}$ is at "H", that is, whether or not the movement of the anchor plate 20 is restrained. When the input terminal $P_{81}$ is at "H" (Step 412), an alarm is sounded from the speaker 97, and when the input terminal $P_1$ is at "L", the indicating lamp 98 is made to flash, whereas, when the input terminal $P_2$ is at "L", the indicating lamp 99 is caused to flash (Step 414). Then, the output terminal $P_3$ and $P_4$ are shifted to "L" to turn OFF the motor 44. It should be noted that the potential of either the output terminal $P_3$ or $P_4$ has already been at "L". Then, $t_{31}$ is set as a value for $t_0$ (Step 418), and the subroutine shown in FIG. 13 is processed to await the elapse of a predetermined time $t_{31}$ (Step 420). Then, the sounding of the alarm from the speaker 97 is stopped (Step 422), and a stop flag "1" is set (Step 500). Then, the process returns to Step 424. In the case where the potential of the input terminal $P_{81}$ is at "L" in Step 412, when the input terminal $P_1$ is at "L", the output terminal $P_3$ is raised to "H", thus causing the motor 44 to rotate forward (Steps 424, 426), whereas, when the input terminal $P_2$ is at "L", the output terminal $P_4$ is raised to "H", thus causing the motor 44 to rotate backward (Steps 428, 430). Then, judgement is made as to whether or not the stop flag "1" is set (Step 601). When the flag "1" is set, $t_{11}$ is set as a value for $t_0$ (Step 602), and the subroutine of the soft-timer shown in FIG. 13 is processed (Step 603). Then, the process returns to Step 418. When the flag "1" is not set, the process returns to Step 412 without executing the above-described processing. Since the outputs from the output terminals $P_3$ to $P_7$, $P_{91}$ and $P_{11}$ are self-maintained, there is no change in the outputs even when the output terminals $P_3$ to $P_7$, $P_{91}$ and $P_{11}$ which are at "H" are further raised to "H". The same is the case with the occasion where the output terminals $P_3$ to $P_7$, $P_{91}$ and $P_{11}$ are at "L". When both the input terminals $P_1$ and $P_2$ are at "H", the process returns to the first Step 400 in which the motor 44 and the indicating lamps 98, 99 are turned OFF, and the above-described processing is then repeated.

A third embodiment of the present invention will be described below with reference to FIG. 14.

The common terminal of the door switch 66 is grounded. The closed-side terminal 66A of the door switch 66 is connected to an input terminal $P_1$ of a microcomputer 368 through the fastening position detecting switch 60 and the seat switch 64. Accordingly, when the door is closed and the occupant is seated in the seat to close the seat switch 64, the potential of the input terminal $P_1$ shifts to a low level (hereinafter referred to as "L"). When the anchor plate 20 is moved toward the rear end of the vehicle and the fastening of the webbing is completed, the fastening position detecting switch 60 is opened, and the potential of the input terminal $P_1$ shifts to a high level (hereinafter referred to as "H").

The open-side terminal 66B of the door switch 66 is connected to an input terminal $P_2$ of the microcomputer 368 through the unfastening position detecting switch 62. Accordingly, when the door is opened, the input terminal $P_2$ shifts to "L", and when the anchor plate 20 is moved toward the front end of the vehicle and the webbing is consequently unfastened, the unfastening position detecting switch 62 is opened, and the input terminal $P_2$ shifts to "H".

A motor forward rotating signal is output from an output terminal $P_3$ of the microcomputer 368 so as to excite a relay coil 74 of a relay 72 through a driving circuit 70, thereby allowing a C-contact (change-over contact) 78 to be activated. A motor reversing signal is output from an output terminal $P_4$ of the microcomputer 368 so as to excite a relay coil 76 of the realy 72 through the driving circuit 70, thereby allowing a C-contact 80 to be activated. The motor 44 is connected to the common terminals of the C-contacts 78 and 80. The normally-open terminal 78A of the C-contact 78 and the normally-open terminal 80A of the C-contact 80 are connected to a +B volt terminal of a power circuit (not shown). The normally-closed terminal 78B of the C-contact 78 and the normally-closed terminal 80B of the C-contact 80 are grounded through a resistor 82. Accordingly, when the relay coil 74 is excited to connect the common terminal of the C-contact 78 and the normally-open terminal 78A thereof, the motor 44 is rotated forward, whereas, when the relay coil 76 is excited to connect the common terminal of the C-contact 80 and the normally-open terminal 80A thereof, the motor 44 is rotated backward.

The current flowing through the motor 44, that is, the current flowing through the resistor 82, is proportional to the voltage across the resistor 82. The voltage across the resistor 82 is supplied to a comparator 290. The voltage is compared with a reference voltage $V_{S2}$ determined by resistances $R_{111}$ and $R_{211}$, and the output of the comparator 290 is supplied to an input terminal $R_{811}$ of the microcomputer 368. More specifically, when the rate of change in the current flowing through the motor 44 exceeds a predetermined value, the potential of the input terminal $P_{811}$ shifts to "H".

A speaker 97 and indicating lamps 98, 99 are connected to the microcomputer 368 through a driving circuit 96. Thus, when the movement of the anchor plate 20 is restrained or any other condition is met, an electronic sound is continuously or intermittently produced from the speaker 97, and the indicating lamps 98 and 99 are made to flash or turn ON, thereby giving warning to the occupant.

Figure 15:
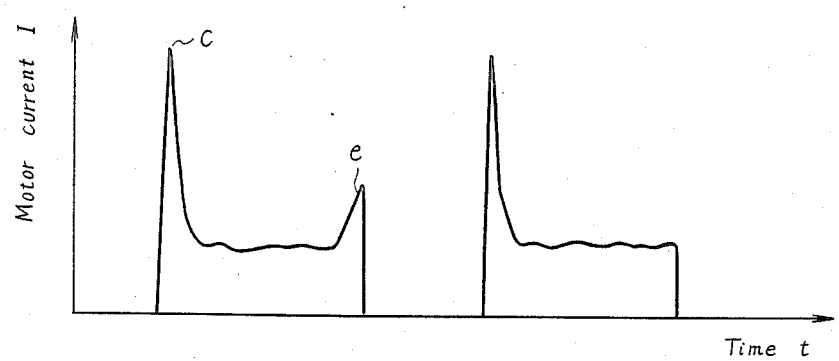
FIG. 15 is a graph showing the current flowing through the motor employed in the third embodiment as a function of time.

The operation of the third embodiment, arranged as described above, will schematically be explained below with reference to the graph shown in FIG. 15 and the waveform chart shown in FIG. 16.

Figure 16:
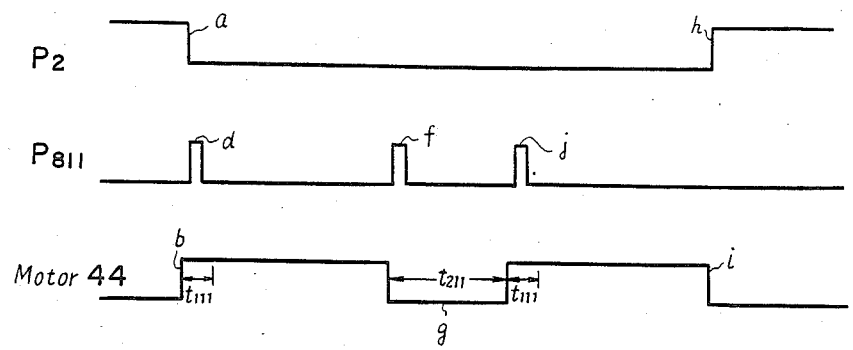
FIG. 16 is a waveform chart showing the output of the microcomputer employed in the third embodiment, the output corresponding to the motor current shown in FIG. 15

In the case where the occupant leaves the vehicle, when the door is opened, the open-side terminal 66B of the door switch 66 is grounded, and the potential of the input terminal $P_2$ of the microcomputer 368 shifts to "L" (see a in FIG. 16). Reading the fall in potential of the input terminal $P_2$, the microcomputer 368 raises the potential of the output terminal $P_3$ to "H" so as to excite the relay coil 74, thus causing the motor 44 to rotate forward (see b in FIG. 16). In consequence, relatively large starting current flows through the motor 44 (see c in FIG. 15), and a pulse is input to the input terminal $P_{811}$ (see d in FIG. 16). Even when the potential of the input terminal $P_{811}$ shifts to "H", the microcomputer 368 ignores this fact until a predetermined time $t_{111}$ has elapsed after the motor 44 has been turned ON. When, after the elapse of the time $t_{111}$, the occupant moves the upper part of his body in order to leave the vehicle and the webbing 14 consequently interferes with the occupant's neck or head and restrains the movement of the anchor plate 20, the impedance of the motor 44 decreases, and the current flowing through the resistor 82 increases (see e in FIG. 15), so that the potential of the input terminal $P_{811}$ shifts to "H" (see f in FIG. 16). When the input terminal $P_{811}$ becomes "H", the microcomputer 368 shifts the potential of the output terminal $P_3$ to "L" so as to turn OFF the motor 44 for a predetermined time $t_{211}$ (see g in FIG. 16). The microcomputer 368 then raises the potential of the output terminal $P_3$ to "H" again so as to turn ON the motor 44, and the above-described processing is repeated thereafter.

Accordingly, when the occupant moves the upper part of his body while the distal end portion of the webbing is moving and the webbing consequently interferes with the occupant's neck or head, the rotation of the motor 44 is instantaneously suspended to stop the movement of the webbing. There is therefore no fear of the occupant feeling uncomfortable and no risk of the motor 44 being burned out.

When the anchor plate 20 moves to the position of the unfastening position detecting switch 62, this switch 62 is opened, thus causing the potential of the input terminal $P_2$ to rise to "H" (see h in FIG. 16). Reading the rise in potential of the input terminal $P_2$, the microcomputer 368 shifts the potential of the output terminal $P_3$ to "L" so as to turn OFF the motor 44 (see i in FIG. 16). When the occupant enters the vehicle also, the apparatus operates in a manner similar to the above.

Figure 17:
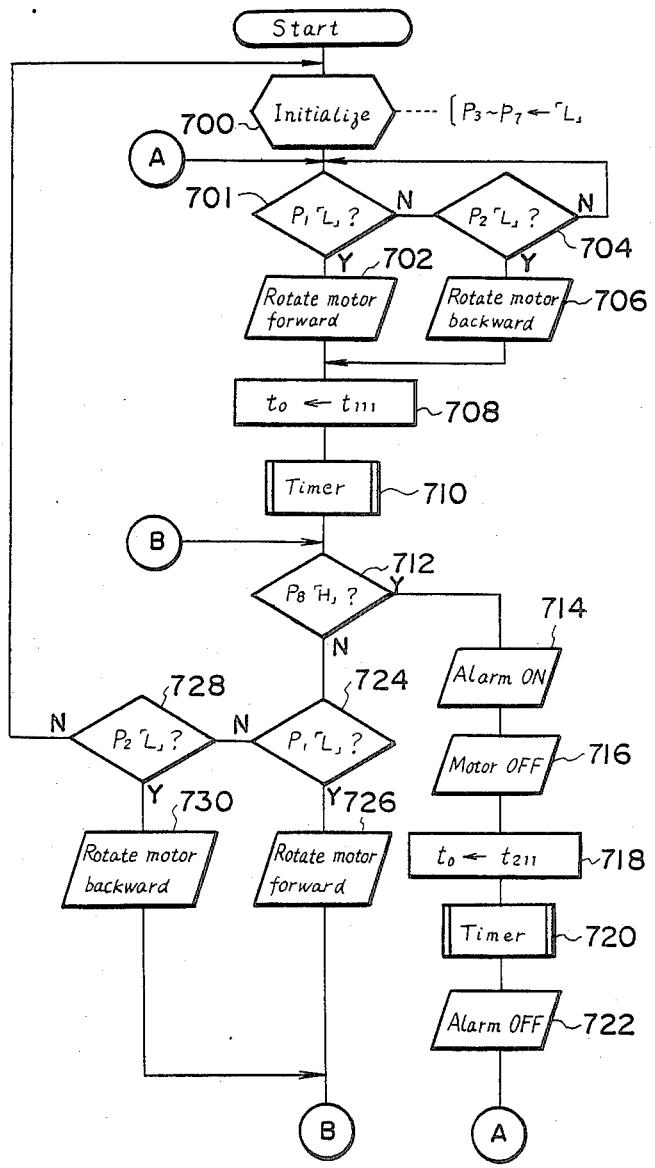
FIGS. 17 and 18 show control flowcharts in accordance with the third embodiment.
Figure 18:
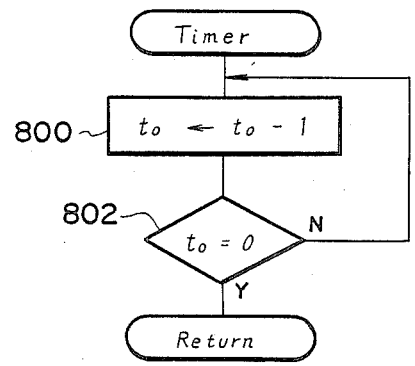

The details of the above-described operation will be explained below with reference to the control flow-charts shown in FIGS. 17 and 18.

First of all, the work area of a RAM incorporated in the microcomputer 368 and the output terminals $P_3$ to $P_7$ thereof are initialized (Step 700), that is, an "L" signal is output from each of the output terminals $P_3$ to $P_7$. The microcomputer 368 awaits until the potential of either the input terminal $P_1$ or $P_2$ becomes "L" (Steps 701, 704). When the microcomputer 68 reads the fact that the potential of the input terminal $P_1$ has become "L", it raises the output terminal $P_3$ to "H", thereby rotating the motor 44 forward, and also shifts the output terminal $P_6$ to "H", thereby turning ON the indicating lamp 98 (Step 702). These outputs are self-maintained until "L" signals are output. The same is the case with the other outputs. When the microcomputer 368 reads the fact that the potential of the input terminal $P_2$ has become "L", the output terminals $P_4$ and $P_7$ are raised to "H", thus causing the motor 44 to rotate backward and the indicating lamp 99 to turn ON (Step 706). When the processing of either Step 702 or 706 has been completed, $t_{111}$ is set as a value for $t_0$ (Step 708), and a subroutine of a soft-timer shown in FIG. 18 is processed (Step 710). More specifically, as shown in FIG. 18, the value of $t_0$ is decremented (Step 800), and this is repeated until the value of $t_0$ becomes zero (Step 802). Thus, it is possible to ignore the fact that the input terminal $P_{811}$ is raised to "H" by the starting current flowing through the motor 44. Then, the microcomputer 368 reads whether or not the potential of the input terminal $P_{811}$ is at "H", that is, whether or not the movement of the anchor plate 20 is restrained. When the input terminal $P_{811}$ is at "H" (Step 712), an alarm is sounded from the speaker 97, and when the input terminal $P_1$ is at "L", the indicating lamp 98 is made to flash, whereas, when the input terminal $P_2$ is at "L", the indicating lamp 99 is caused to flash (Step 714). Then, the output terminals $P_3$ and $P_4$ are shifted to "L" to turn OFF the motor 44. It should be noted that the potential of either the output terminal $P_3$ or $P_4$ has already been at "L". Then, $t_{211}$ is set as a value for $t_0$ (Step 718), and the subroutine shown in FIG. 18 is processed to await the elapse of a predetermined time $t_{211}$ (Step 720). Then, the sounding of the alarm from the speaker 97 is stopped, and when the input terminal $P_1$ is at "L", the indicating lamp 98 is turned ON, whereas, when the input terminal $P_2$ is at "L", the indicating lamp 99 is turned ON (Step 722). Then, the process returns to Step 701 in order not to read the "H" potential (shown by j in FIG. 16) of the input terminal $P_{811}$ for the period of time $t_{111}$ when the motor 44 is activated again. In the case where the potential of the input terminal $P_{811}$ is at "L" in Step 712, when the input terminal $P_1$ is at "L", the output terminal $P_3$ is raised to "H", thus causing the motor 44 to rotate forward (Steps 724, 726), whereas, when the input terminal $P_2$ is at "L", the output terminal $P_4$ is raised to "H", thus causing the motor 44 to rotate backward (Steps 728, 730). Then, the process returns to Step 712. Since the outputs from the output terminals $P_3$ to $P_7$ are self-maintained, there is no change in the outputs even when the output terminals $P_3$ to $P_7$ which are at "H" are further raised to "H". The same is the case with the occasion where the output terminals $P_3$ to $P_7$ are at "L". When both the input terminals $P_1$ and $P_2$ are at "H", the process returns to the first Step 700 in which the motor 44 and the indicating lamps 98, 99 are turned OFF, and the above-described processing is then repeated.

Figure 19:
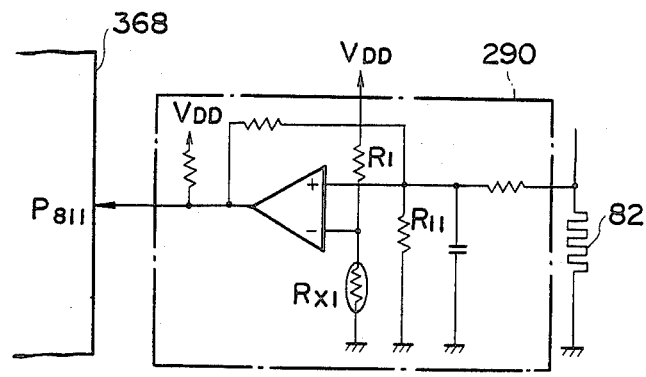
FIG. 19 shows an essential part of a fourth embodiment of the seatbelt system controlling apparatus according to the present invention.

A fourth embodiment of the present invention will be described below with reference to FIG. 19.

In this forth embodiment, a thermistor $R_{X1}$ is employed in place of the resistor $R_{211}$ in the comparator 290. Accordingly, as the ambient temperature rises, the voltage input to the − input terminal of the operation amplifier, that is, the reference voltage, lowers. For this reason, even when the ambient temperature varies to change the viscosity of the grease applied to the guide rail 22 and consequently change the resistance to slide of the anchor plate 20, it is possible to cope with such change and reliably detect any mechanical locking of the anchor plate 20.

Figure 20:
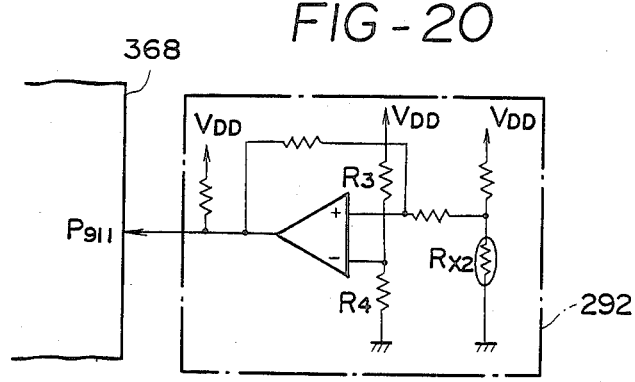
FIG. 20 shows an essential part of a fifth embodiment of the seatbelt system controlling apparatus according to the present invention.

The following is a description of a fifth embodiment of the present invention with reference to FIG. 20.

Figure 14:
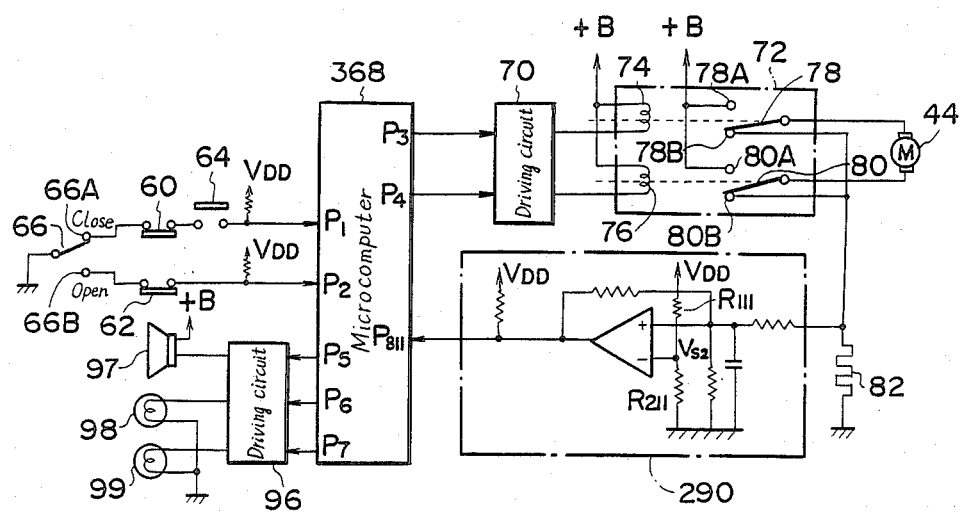
FIG. 14 is a circuit diagram of a third embodiment of the seatbelt system controlling apparatus according to the present invention.

In the fifth embodiment, a temperature detecting circuit 292 is connected to an input terminal $P_{911}$ of the microcomputer 368, in addition to the arrangement shown in FIG. 14. The temperature detecting circuit 292 is constituted by a comparator in which a change in resistance of a thermistor $R_{X2}$ whose resistance decreases as the ambient temperature rises is detected as a change in voltage and compared with a reference voltage. When the ambient temperature exceeds a predetermined temperature, an "H" signal is output to the input terminal $P_{911}$ of the microcomputer 368. When the input terminal $P_{911}$ is at "H", that is, when the ambient temperature exceeds a predetermined temperature, the microcomputer 368 effects control similar to that in the case of the third embodiment. When the input terminal $P_{911}$ is at "L", the motor is not turned OFF even when the input terminal $P_{811}$ is shifted to "H". More specifically, processing of Steps 714 to 720 in FIG. 17 is not executed. Accordingly, even when the resistance to slide of the anchor plate 20 increases because of low temperature, there is no fear of the anchor plate 20 being misjudged to be mechanically locked.

It should be noted that the circuit, shown in FIG. 1, adapted for suspending the motor for a predetermined period of time when the motor is mechanically locked may also be applied to other devices, e.g., a power-driven window system for a vehicle.

What is claimed is:

1. An apparatus for controlling a seatbelt system in which the distal end portion of a webbing is moved along the longitudinal axis of a vehicle by a motor, thereby allowing said webbing to be fastened to and unfastened from the body of an occupant, which comprises:

(a) motor overload detecting means connected to said motor for detecting an overloading state of said motor; and (b) motor suspending means for deactuating said motor for a predetermined period of time when a motor overload signal is transmitted thereto from said motor overload detecting means after a predetrmined period of time has elapsed from the time of starting said motor, thereby preventing the webbing from applying unwanted pressure to the body of the occupant should the occupant obstruct the movement of the distal end portion of the webbing, and further preventing said motor from being burned out.

2. An apparatus according to claim 1, wherein said motor overload detecting means has means for detecting when the current flowing through said motor exceeds a predetermined value.

3. An apparatus according to claim 1, wherein said motor overload detecting means includes motor current detecting means for detecting when current flows through said motor, and a motor overcurrent detecting circuit, said motor overload signal being a motor overcurrent signal output from said motor overcurrent detecting circuit.

4. An apparatus according to claim 3, wherein said motor overcurrent detecting circuit has normal current holding means for holding as a normal current a current detected when a predetermined period of time has elapsed after the starting of said motor.

5. An apparatus according to claim 3, wherein said motor current detecting means is constituted by a motor current detecting resistor connected in series to said motor, said motor overcurrent detecting circuit including a comparator to which the voltage across said motor current detecting resistor is input and which compares the input voltage with a reference voltage to output a motor overcurrent signal.

6. An apparatus according to claim 5, wherein the reference signal input to said comparator is lowered as temperature rises by employing a thermistor.

7. An apparatus according to claim 6, further comprising a temperature detecting circuit, said motor suspending means having means for preventing said motor from being turned OFF even if a motor overcurrent signal is input when the temperature detected by said temperature detecting circuit is less than a predetermined value.

8. An apparatus according to claim 2, wherein said motor suspending means is constituted by a microcomputer.

9. An apparatus for controlling a seatbelt system in which the distal end portion of a webbing is moved in the longitudinal direction of a vehicle by a motor, thereby allowing said webbing to be automatically fastened to and unfastened from the body of an occupant, which comprises:
(a) a driving circuit connected to said motor for driving it;
(b) motor current detecting means connected to said motor for detecting current flowing through said motor;
(c) a motor overcurrent detecting circuit connected in parallel to said motor current detecting means and adapted to detect an abnormally high motor current and output a motor overcurrent signal; and
(d) motor suspending means for turning OFF said motor for a predetermined period of time through said driving circuit when it receives a motor overcurrent signal from said motor overcurrent detecting circuit after a predetermined period of time has elapsed from the time of starting said motor,
whereby, even when the occupant moves during the movement of the distal end portion of said webbing and said webbing consequently interferes with the occupant's neck or head, it is possible to prevent the occupant from feeling uncomfortable and said motor from being burned out.

10. An apparatus according to claim 9, wherein said motor current detecting means is constituted by a motor current detecting resistor connected in series to said motor.

11. An apparatus according to claim 10, wherein said motor overcurrent detecting circuit includes a voltage amplifying circuit to which the voltage across said motor current detcting resistor is input and which amplifies said input voltage, a differentiation circuit which removes a DC component from said amplified voltage, and a comparator which makes comparison between the output voltage of said differentiation circuit and a reference voltage and outputs the result of the comparison to said motor suspending means.

12. An apparatus according to claim 10, wherein said motor overcurrent detecting circuit includes a voltage amplifying circuit to which the voltage across said motor current detecting resistor is input and which amplifies the input voltage, and a comparator which has a + input terminal to which the output of said voltage amplifying circuit is input through a resistor and a − input terminal to which a reference voltage is input and which comparator outputs a motor overcurrent signal.

13. An apparatus according to claim 12, wherein said reference voltage is given from normal current holding means for holding as a normal current value a current value detected after a predetermined period of time has elapsed from the time of starting said motor.

14. An apparatus according to claim 13, wherein said normal current holding means includes a capacitor supplied with a signal output from said voltage amplifying circuit.

15. An apparatus according to claim 10, wherein said motor overcurrent detecting circuit includes a comparator which has a + input terminal to which the voltage across said motor current detecting resistor is input and a − input terminal to which a reference voltage is input and which comparator outputs a motor overcurrent signal.

16. An apparatus according to claim 15, wherein said reference voltage input to the − input terminal of said comparator is lowered as temperature rises by employing a thermistor.

17. An apparatus according to claim 16, further comprising a second comparator having a + input terminal to which a reference voltage is input and a − input terminal to which is input as a variable voltage a change in resistance of a thermistor whose resistance decreases as the ambient temperature rises, said second comparator making comparison between the two voltages and outputting a signal to said motor suspending means when the temperature is less than a predetermined value, said signal preventing said motor from being turned OFF even when a motor overcurrent signal is input to said motor suspending means.

18. An apparatus for controlling a seatbelt system in which the distal end portion of webbing is moved in the longitudinal direction of a vehicle by a motor, thereby allowing said webbing to be automatically fastened to and unfastened from the body of an occupant, which comprises:
(a) a motor driving circuit which, when the occupant enters the vehicle, rotates said motor forward so as to move the distal end portion of said webbing toward the rear end of the vehicle, and which, when the occupant leaves the vehicle, rotates said motor backward so as to move the distal end portion of said webbing toward the front end of the vehicle;
(b) a resistor connected in series to said motor to output a current flowing through said motor in the form of the voltage across said resistor;
(c) a motor overcurrent detecting circuit connected in parallel to said resistor and having a + input terminal to which the voltage across said resistor is input and a − input terminal to which a reference voltage is input, said detecting circuit making comparison between the two voltages to output a motor overcurrent signal;

(d) motor suspending means adapted to output a motor suspending signal to said motor driving circuit when it receives a motor overcurrent signal from said motor overcurrent detecting circuit after a predetermined period of time has elapsed from the time of starting said motor, thereby temporarily turning OFF said motor; and (e) alarm means for giving warning to the occupant when it receives a motor suspending signal from said motor suspending means, whereby, even when the occupant moves during the movement of the distal end portion of said webbing and said webbing consequently interferes with the occupant's neck or head, it is possible to prevent the occupant from feeling uncomfortable and said motor from being burned out.

19. An apparatus for controlling a seatbelt system in which the distal end portion of a webbing is moved along the longitudinal axis of a vehicle by an electric motor, thereby allowing said webbing to be fastened to and unfastened from the body of an occupant, comprising:

(a) a motor driving circuit for actuating said motor to rotate in first and second directions to move the distal end portion of said webbing toward and away from the rear end of the vehicle, respectively;

(b) a motor overload detecting means connected to said motor for detecting when said motor is in a current overloaded state; and (c) a motor suspending means for deactuating said motor for a predetermined period of time when a motor overload signal is transmitted thereto from the motor overload detecting means, thereby preventing the webbing from applying unwanted pressure to the body of the occupant should the occupant obstruct the movement of the distal end portion of the webbing, and further preventing burn-out of the motor from a current overload.

* * * * *